United States Patent [19]

Wu

[11] Patent Number: 5,158,413
[45] Date of Patent: Oct. 27, 1992

[54] CAR PARKING FRAME

[76] Inventor: Yu-Feng Wu, No. 152, Chang Shiu Rd. Sec. 4, Hsi Hu Chen, Changhwa Hsien, Taiwan

[21] Appl. No.: 672,566

[22] Filed: Mar. 20, 1991

[51] Int. Cl.$^5$ .............................................. E04H 6/02
[52] U.S. Cl. ...................................... 414/228; 414/233
[58] Field of Search ............................. 414/227–230, 414/233, 234; 254/2 R, 2 B, 2 C, 4 R, 4 B, 4 C, 45

[56] References Cited

U.S. PATENT DOCUMENTS

| | | | |
|---|---|---|---|
| 3,706,356 | 12/1972 | Herbst et al. | 414/228 X |
| 4,772,172 | 9/1988 | Rosen | 414/228 X |
| 5,035,562 | 7/1991 | Rosen | 414/228 X |
| 5,067,866 | 11/1991 | Fusaro et al. | 414/228 |

FOREIGN PATENT DOCUMENTS

| | | | |
|---|---|---|---|
| 1193660 | 5/1965 | Fed. Rep. of Germany | 414/227 |
| 44977 | 4/1977 | Japan | 414/228 |
| 153175 | 6/1990 | Japan | 414/233 |

*Primary Examiner*—David A. Bucci
*Attorney, Agent, or Firm*—Bacon & Thomas

[57] ABSTRACT

A car parking frame provided with upper and lower floors supported between rail assemblies, with each floor being movable by a motor driven chain assembly to permit the independent parking of a car on either floor level.

4 Claims, 5 Drawing Sheets

CAR PARKING FRAME

BACKGROUND OF THE INVENTION

The present invention relates to a car parking frame, and more particularly to a car parking frame designed with two levels of parking floors capable of operating independently.

As surface parking lots have increasingly become too expensive and difficult to come by vertical parking facilities are gaining popularity among the parking lot operators. As far as a small parking lot is concerned, a vertical parking frame with two levels of parking floors is especially useful and economical by virtue of its structural simplicity which results in the assembly and installation thereof being relatively easy and inexpensive.

The prior art parking frame with two levels of parking floors is disadvantageous in design because the upper and lower levels do not work independently. For example, a car intended to be parked on the upper level must be parked on the lower level before it is hoisted vertically to the upper level. However, some of prior art parking frames have been improved so that they allow a car intended to be parked on the upper level to bypass the lower level, as shown in FIG. 1. This improved parking frame is equipped with an elevator which is actuated by an oil-pressure system with a circular arc path of 45 degrees to prevent the car being hoisted to the upper level from making a frictional contact with the car already parked on the lower level. As a result, the upper bracket has to be built at a higher position, thus resulting in a situation wherein the whole parking frame is too large to be installed indoors.

SUMMARY OF THE INVENTION

It is, therefore, the primary objective of the present invention to provide a car parking frame which permits a car to be parked on the upper level without first requiring it to be parked on the lower level.

It is another objective of the present invention to provide a parking frame which is constructed in such a manner that the height of the upper level is substantially lowered in order to reduce the overall size of the parking frame.

In keeping with principles of the present invention, the primary objectives of the present invention are achieved by a parking frame comprising upper and lower rails, an upper level floor, and a lower level floor. The upper and the lower rails are arranged in parallel and are composed of a longitudinal section, a horizontal section and a curved section as a boundary between the longitudinal and the horizontal sections. The upper level floor has two vertical sections disposed at rear corners thereof. Located at both sides of the vertical sections are sliding wheels positioned correspondingly to the rails. The sliding wheel positioned correspondingly to the upper rail is located relatively higher than the lower rail so as to permit the upper level floor to move in a horizontal manner by means of a chain. The lower level floor is equipped with a plurality of rollers disposed thereunder to permit the lower level floor to make a horizontally reciprocating movement, which is actuated by a chain.

DETAILED DESCRIPTION OF THE PREFERRED EMBODIMENT

Figure 1:
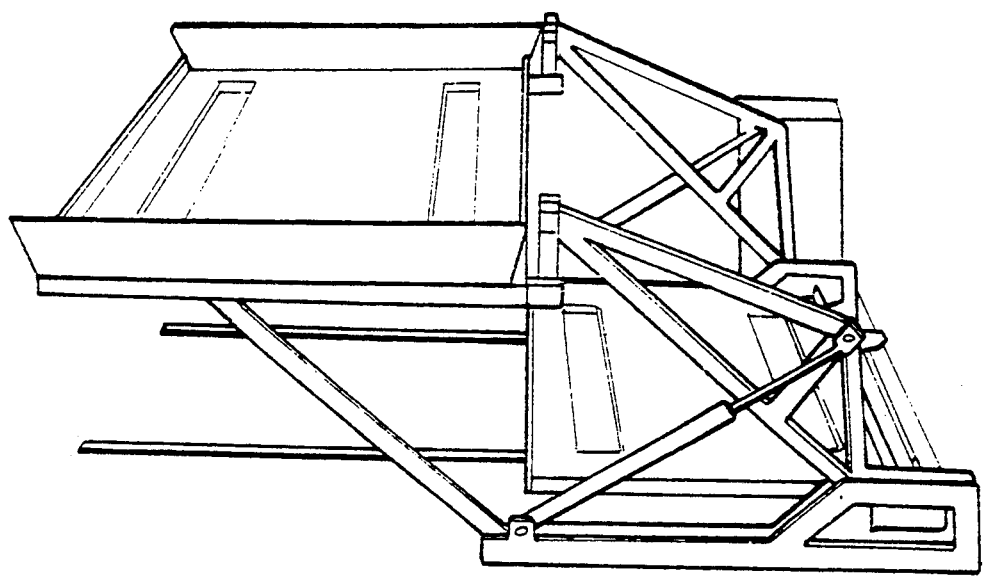
FIG. 1 shows a three-dimensional view of a prior art car parking frame with dual levels of parking floors.
Figure 2:
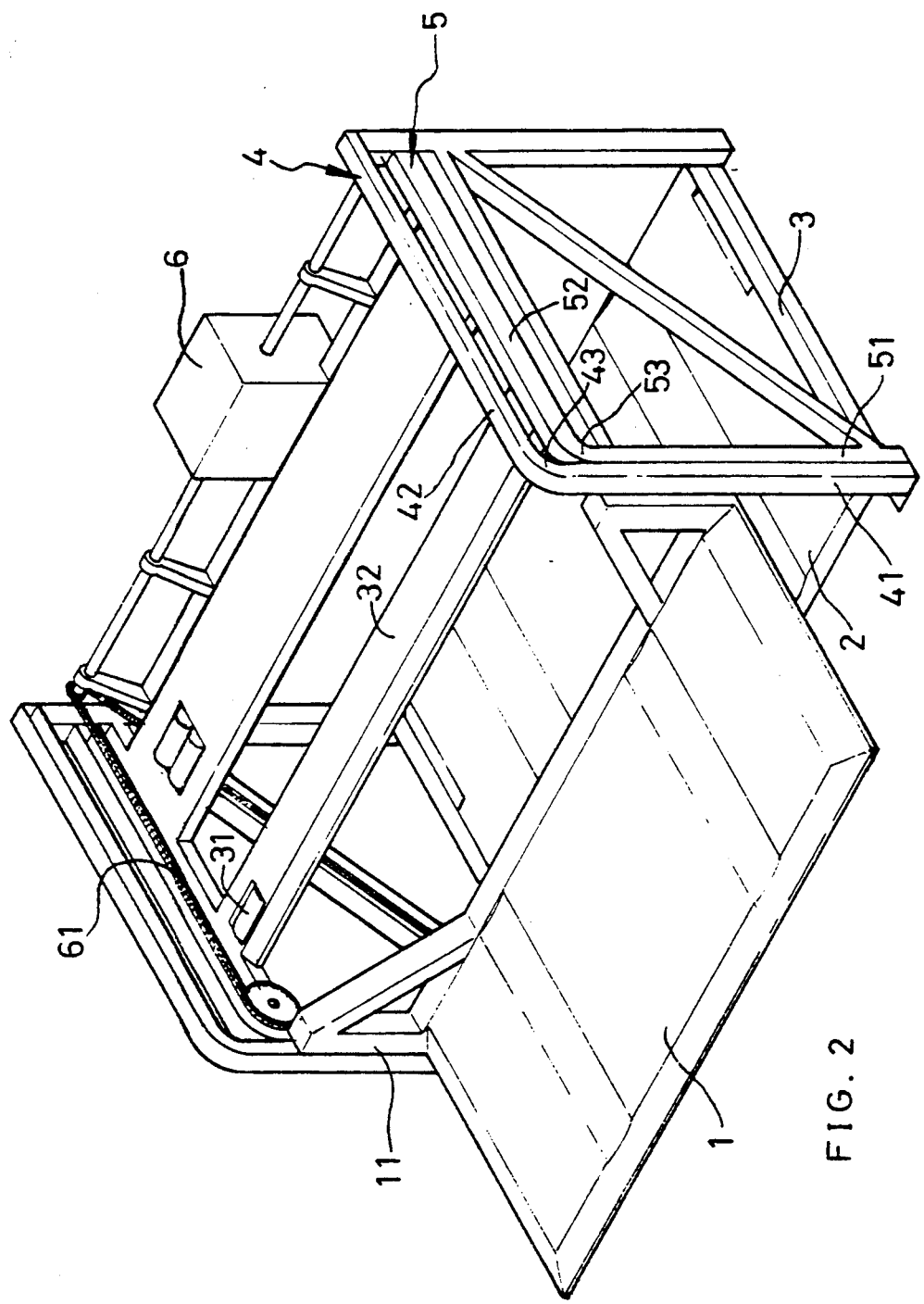
FIG. 2 shows a three-dimensional view of the preferred embodiment of the present invention.

Referring to FIGS. 2-6, the car parking frame embodied in the present invention is shown comprising an upper level floor 1 and a lower level floor 2. The main body 3 is composed of a plurality of strong frame members, some of which are constructed as rails. Located at each of two opposite sides of the main body 3 are an upper rail 4 and a lower rail 5 arranged in parallel. Each of upper and lower rails 4, 5 is composed of longitudinal sections 41 and 51, horizontal sections 42 and 52, and curved sections 43 and 53 of a high curvature located between longitudinal sections 41, 51 and horizontal sections 42, 52. The upper level floor 1 is composed of two vertical sections 11 disposed at two rear corners thereof. Two sliding wheels 12 and 13 are arranged in the vicinity of the vertical section 11. These two sliding wheels 12 and 13 are capable of sliding along rails 4 and 5 respectively in a manner that the sliding wheel 13 slides along the lower rail 5 to reach the curve section 53 at the same time as the sliding wheel 12 does along the upper rail 4 to reach the curve section 43. As a result, the upper level floor 1 is capable of moving by maintaining the position thereof on a horizontal level. A reinforced support frame 32 with a roller 31 attached thereto is mounted between horizontal sections 52 of lower rails 5 located at two opposite sides of main body 3. Now referring to FIG. 6, there are two restrictive wheels 21 disposed at the bottom of lower level floor 2 in correspondence to rails. In conjunction with a plurality of rollers 22, the restrictive wheels 21 serve to confine the movement of lower level floor 2 on a linear path.

Figure 3:
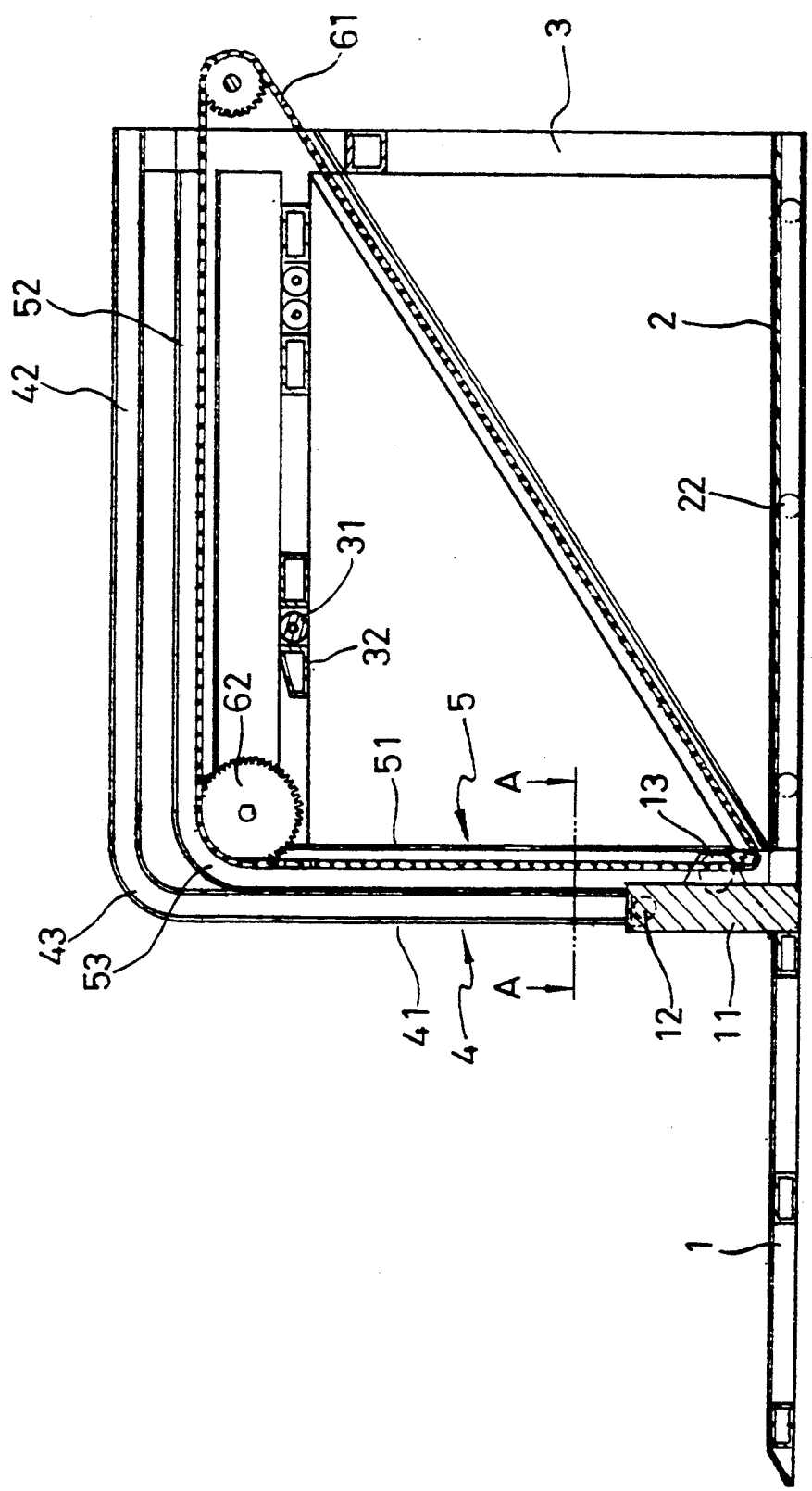
FIG. 3 shows a schematic view of the upper level parking floor according to the present invention in operation.
Figure 4:
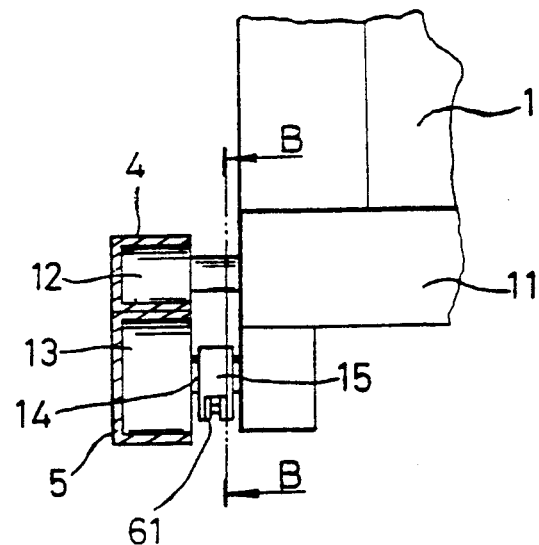
FIG. 4 shows a cut-away view of the portion taken along line A—A, as shown in FIG. 3.
Figure 5:
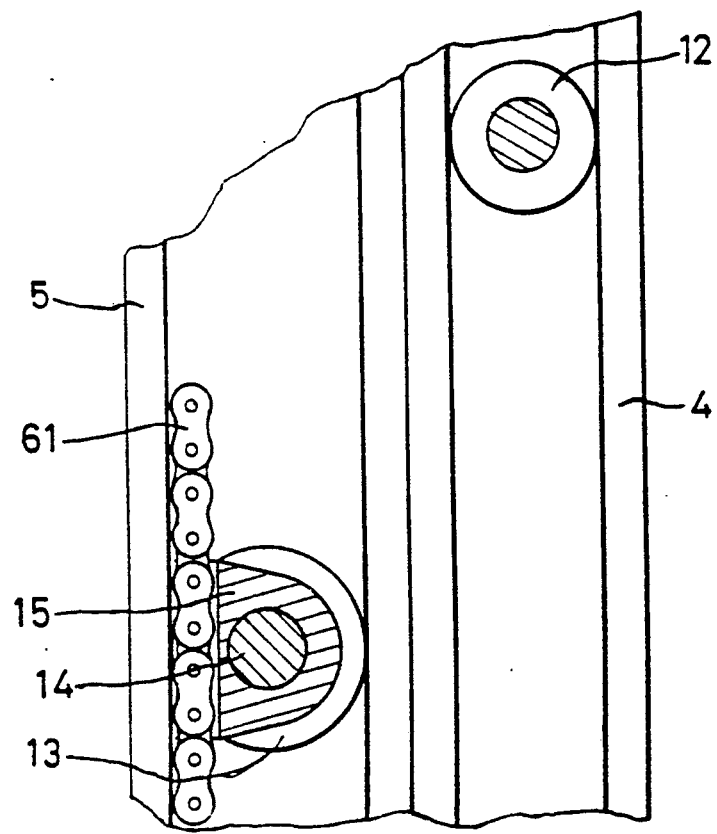
FIG. 5 shows a cut-away view of the portion taken along line B—B, as shown in FIG. 4.
Figure 6:
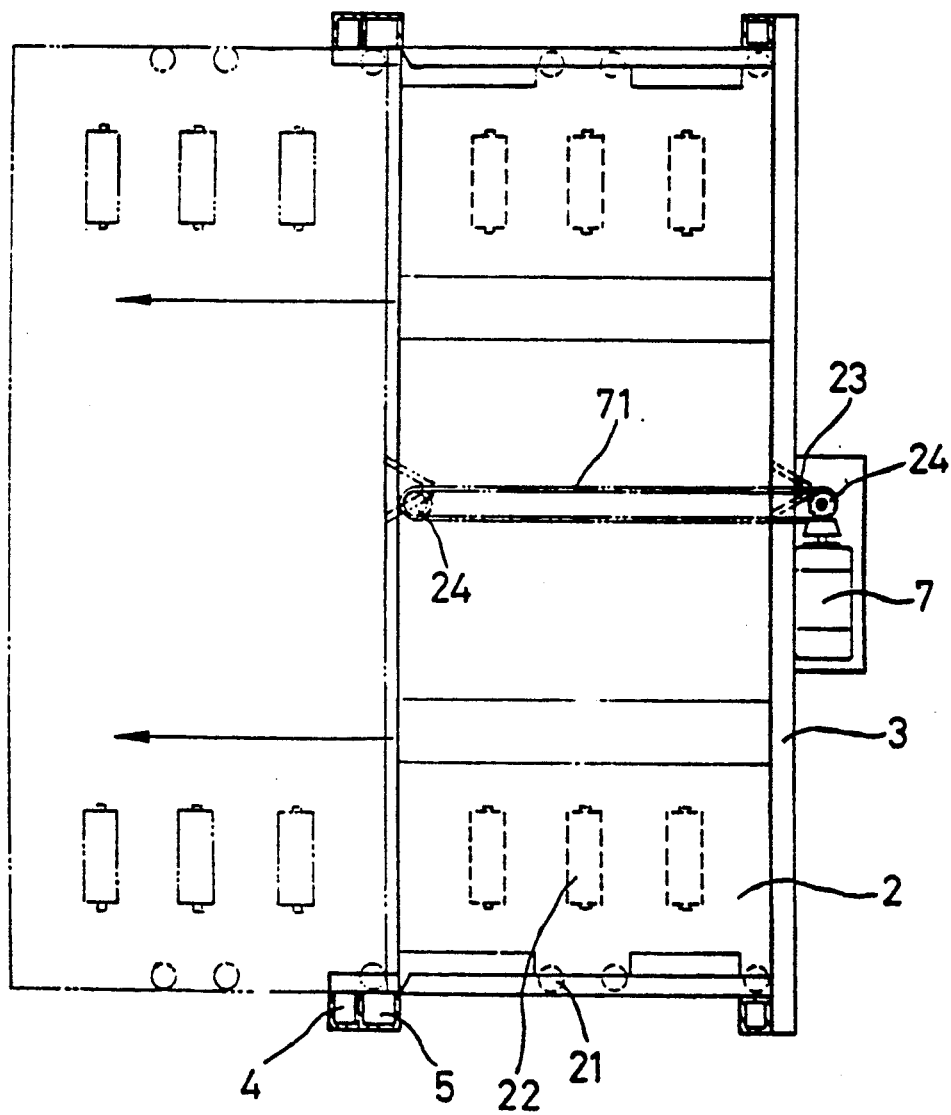
FIG. 6 shows a schematic view of the lower level parking floor according to the present invention in operation.

The movement of both upper and lower level floors 1 and 2 is achieved mechanically by means of two chains 61 and 71 actuated by two motors 6 and 7. The upper level floor 1 includes a connector 15, which is capable of moving freely and is pivotally mounted on the axle 14 of the lower sliding wheel 13, as shown in FIG. 4. In addition, the chain 61 is held on the connector 15. By the means of the support of a chain wheel 62, the chain 61 serves to confine the position of the upper level floor 1 on a horizontal level when the upper level floor 1 moves past the curved sections 43 and 53, as shown in FIG. 3. Now referring to FIG. 6, the lower level floor 2 is shown being attached to chain 71 at the rear bottom end 23 thereof. The chain 71, which is actuated by the motor 7 and moves between two chain wheels 24, is used to confine the movement of the lower level floor 2 into and out of the parking frame on a linear path so as to maintain the position of the lower level floor 2 in motion on a horizontal level.

I claim:

1. A car parking frame comprising:

a) a main body including a pair of opposed rail assemblies, each rail assembly including an upper rail and a lower rail disposed substantially in parallel, with each of the upper and lower rails being defined by a longitudinal section, a curved section and a horizontal section;
b) a lower level floor disposed between the rail assemblies and provided with a plurality of rollers at an underside thereof to permit the lower level floor to extend and retract with respect to the main body; and
c) an upper level floor including two vertical sections positioned at a pair of rear corners thereof, each vertical section being provided with wheel means disposed in sliding engagement with the upper and lower rails of a rail assembly to permit the upper level floor to move along the rail assemblies while maintaining a horizontal disposition.

2. The car parking frame of claim 1 further including:
a) a chain wheel and a chain supported thereon;
b) at least one of the wheels being provided with an axle, a connector pivotably mounted on the axle and the chain being engaged with the connector; and
c) a motor for driving the chain to move the upper floor level along the rail assemblies.

3. The car parking frame of claim 1 further including:
a) a pair of chain wheels;
b) a chain secured to the lower level floor and supported on the chain wheels; and
c) a motor for driving the chain to extend and retract the lower level floor.

4. The car parking frame of claim 1 wherein each wheel means includes a pair of wheels, with one wheel being slidably engaged within the lower rail and the other wheel being slidingly engaged within the upper rail.

* * * * *